(12) United States Patent
Sampson et al.

(10) Patent No.: US 6,490,624 B1
(45) Date of Patent: Dec. 3, 2002

(54) SESSION MANAGEMENT IN A STATELESS NETWORK SYSTEM

(75) Inventors: Lawrence C. Sampson, San Jose, CA (US); Emilio Belmonte, Seville (ES)

(73) Assignee: Entrust, Inc., Plano, TX (US)

( * ) Notice: Subject to any disclaimer, the term of this patent is extended or adjusted under 35 U.S.C. 154(b) by 0 days.

(21) Appl. No.: 09/363,315

(22) Filed: Jul. 28, 1999

Related U.S. Application Data

(63) Continuation-in-part of application No. 09/113,609, filed on Jul. 10, 1998, now Pat. No. 6,182,142.

(51) Int. Cl.$^7$ .............................................. G06F 13/00
(52) U.S. Cl. ...................... 709/227; 709/202; 709/217; 709/223
(58) Field of Search ................................. 709/202, 203, 709/217, 219, 223, 224, 225, 227, 228, 229; 713/201, 202

(56) References Cited

U.S. PATENT DOCUMENTS

| | | | |
|---|---|---|---|
| 5,944,824 A | * 8/1999 | He .............................. | 713/201 |
| 5,974,566 A | * 10/1999 | Ault et al. ..................... | 714/15 |
| 6,052,785 A | * 4/2000 | Lin et al. ..................... | 713/201 |
| 6,076,108 A | * 6/2000 | Courts et al. ................ | 709/227 |
| 6,115,040 A | * 9/2000 | Bladow et al. ............. | 345/335 |

* cited by examiner

*Primary Examiner*—Viet D. Vu
(74) *Attorney, Agent, or Firm*—Marcel K. Bingham; Hickman Palermo Truong & Becker LLP

(57) ABSTRACT

In a system that controls access to information resources, a session manager in cooperation with a topology mechanism enables a client to securely interact with a plurality of access servers and associated runtime elements using a plurality of sessions that are coordinated and tracked. The information resources are stored on protected servers. Access to each of the protected servers is controlled by one of the access servers. Client session information is stored in a session manager that is bound to and associated with the runtime of the access server, and the topology mechanism. In operation, a user of a client or browser logs in to an access server and then submits a request for a resource of a protected server associated with a different access server. A runtime module on the access server receives the request and asks the session manager to validate the session. The session manager determines whether the client is involved in an authenticated session with any access server in the system. If so, the client is permitted to access the resources without logging in to the specific access server that is associated with the protected server. In this way, the client can access multiple resources of multiple protected servers, in a stateless network system, without logging in to each of the access servers that controls each of the protected servers.

31 Claims, 11 Drawing Sheets

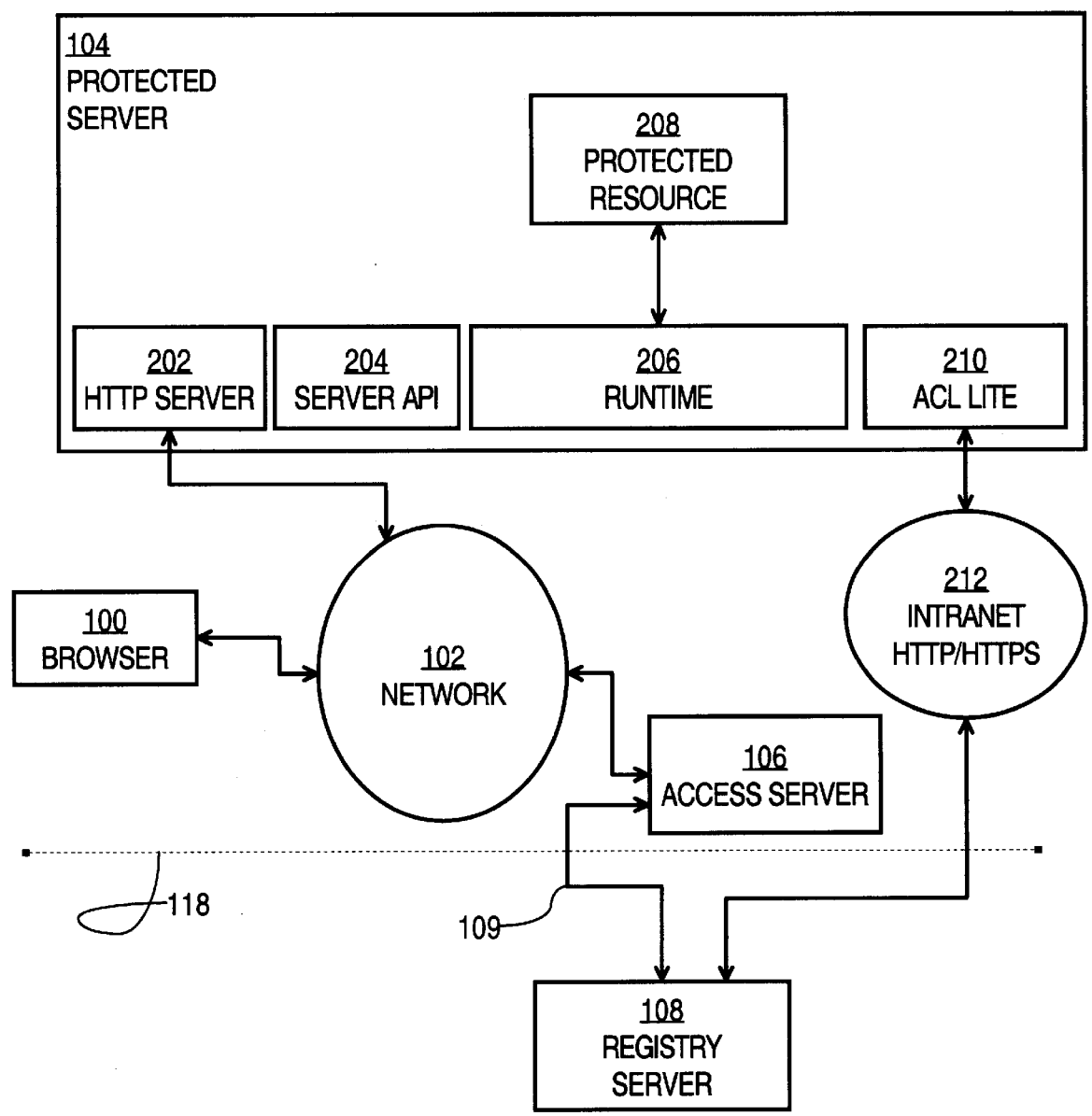

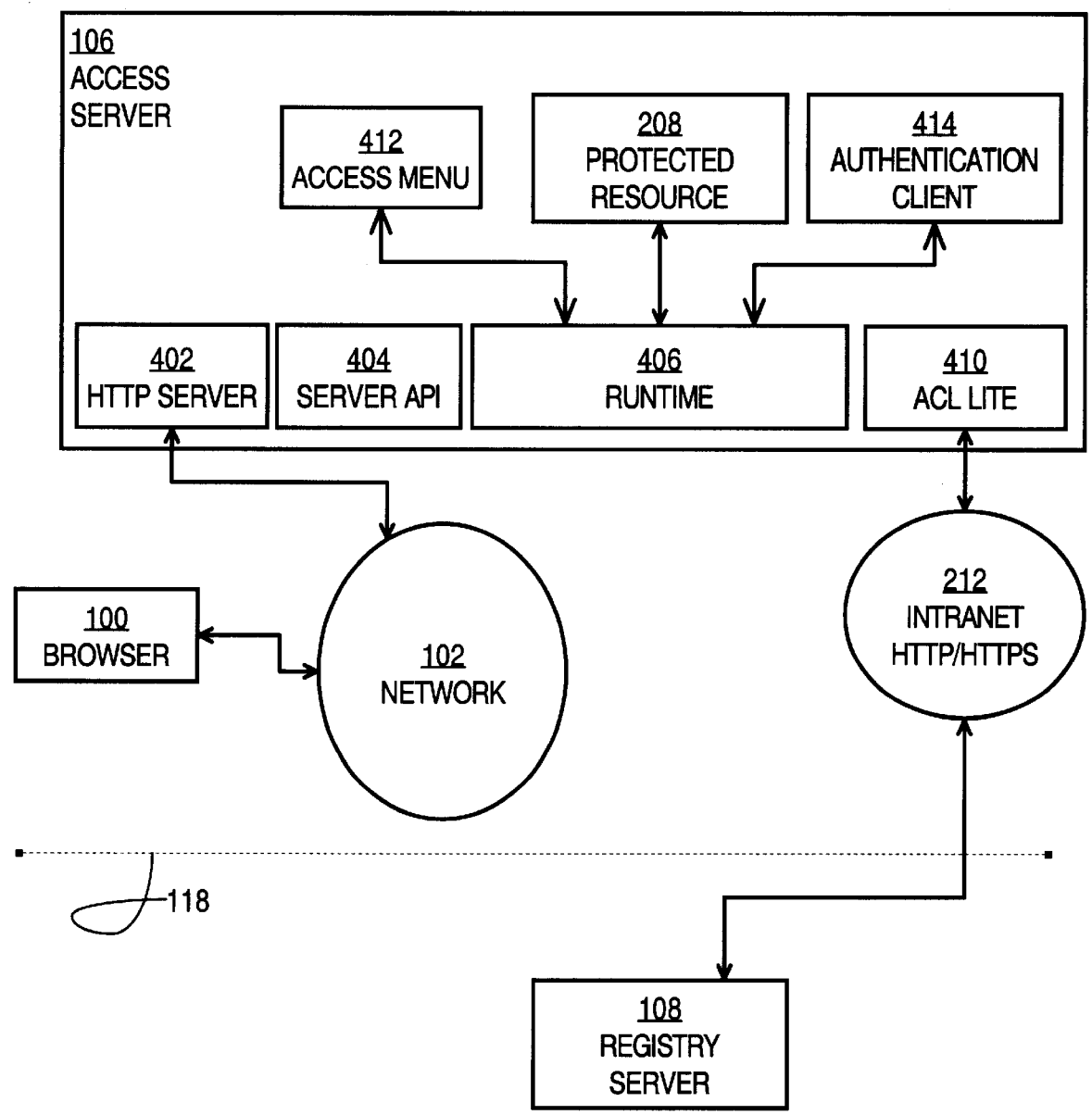

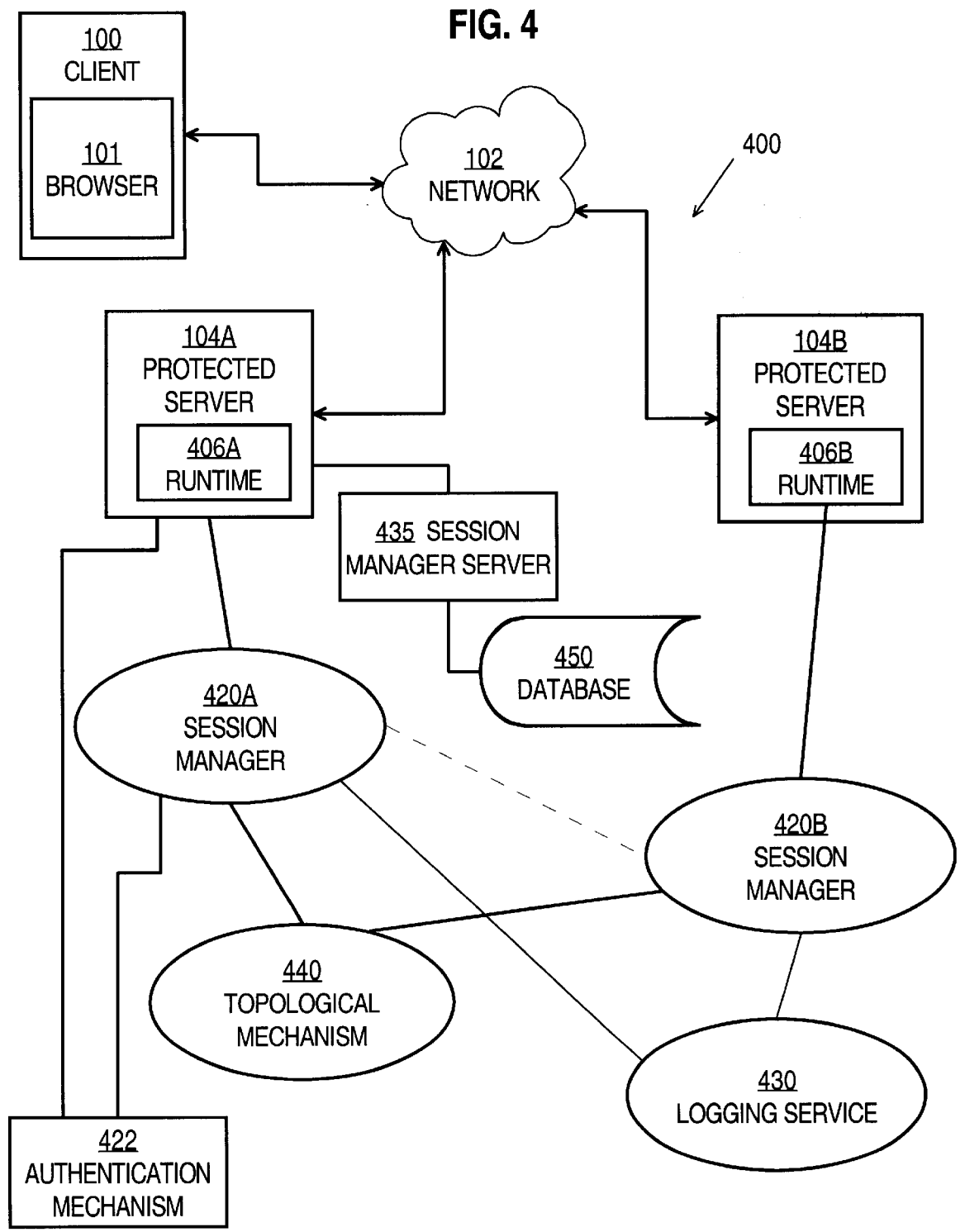

SESSION MANAGEMENT IN A STATELESS NETWORK SYSTEM

RELATED APPLICATIONS

Continuation-in-part of Ser. No. 09/113,609, filed Jul. 10, 1998, entitled "Controlling Access to Protected Information Resources," and naming Teresa Win and Emilio Behnonte as inventors, now U.S. Pat. No. 6,182,142. Domestic priority is claimed from such prior application. The entire disclosure of such prior application is hereby incorporated by reference as if fully set forth herein.

FIELD OF THE INVENTION

This invention generally relates to information retrieval over a network, and, more specifically, to a method, apparatus, and product for managing one or more sessions in a stateless network system.

BACKGROUND OF THE INVENTION

Computer networks have become ubiquitous in business, industry, and education. In one approach, a network is configured with one or more user accounts, each of which is uniquely associated with a human network user or host computer. The network also has one or more resources, such as application programs that provide various computing functions, which are available to all users. In this approach, a user logs into his or her user account, selects a desired application. A disadvantage of this approach is that every user has the same rights to access any of the network resources.

Development of the globally accessible, packet-switched network known as the Internet has enabled network resources, accounts and applications to become available worldwide. Development of hypertext protocols that implement the World Wide Web ("The Web") is enabling networks to serve as a platform for global electronic commerce. In particular, the Web is enabling the easy exchange of information between businesses and their customers, suppliers and partners.

Businesses are rushing to publish information on the Web and just as quickly stumbling into several roadblocks. For example, some information is valuable and sensitive, and needs to be made available only to selected users. Thus, there is a need to provide selective access to network resources and information over the Web.

This need exists in the context of internal Web networks that are available to employees of an organization, called Intranets, as well as Web networks and resources that are available to external customers, suppliers and partners of the organization, called extranets. Extranet users may require information from a large number of diverse sources, for example, product catalogs, customer databases, or inventory systems. There may be millions of potential users, the number of which grows dramatically as an organization prospers. Thus, there is a need for a large-scale system that can provide selective access to a large number of information sources for a large number of users.

Because some of the information sources are sensitive, there is a need to provide secure access to the information. Current networks and Web systems, including Intranets and extranets, are expensive and complex to implement. These technologies also change rapidly. There is a need for any information access method or system to integrate with and use existing equipment, software and systems. There is also a need for method and system that is flexible or adaptable to changing technologies and standards.

One approach to some of the foregoing problems and needs has been to provide each network resource or application program with a separate access control list. The access control list identifies users or hosts that are authorized to access a particular application. As new users or hosts are added to the network, the access control lists grow, making security management more complicated and difficult. Use of a large number of separate lists also makes the user experience tedious and unsatisfactory.

Another disadvantage of the foregoing approaches is duplication of management processes. To add new users to the system, a network administrator must repeat similar access processes for each application or resource to be made available to the new users. The redundancy of these processes, combined with rapid growth in the number of users, can make the cost of deploying, managing and supporting a system unacceptably high.

Thus, there is a need for a mechanism to govern access to one or more information resources in which selective access is given to particular users.

There is also a need for such a mechanism that is equally adaptable to an internal network environment and to an external network environment. There is a further need for such a mechanism that is easy to configure and re-configure as new users and resources become part of the system. There is still another need for such a mechanism that is simple to administer.

A related approach is described in prior application Ser. No. 09/113,609, filed Jul. 10, 1998, now U.S. Pat. No. 6,182,142 entitled "Controlling Access to Protected Information Resources," and naming Teresa Win and Emilio Belmonte as inventors. In an embodiment of the system described in such prior application, a client process interacts with one or more server processes to obtain authorization to access protected resources. These interactions generally occur during one or more HTTP sessions that are established between the client and the server.

One problem of this configuration is how to store and manage information about the sessions. Since HTTP is a stateless protocol, it does not inherently have a mechanism for keeping track of information from session to session. A prior approach to this problem involves creating, storing, and accessing locally stored files called "cookies." A cookie is a text file, created and stored at the client, that contains information that identifies a particular session. In one embodiment of the system described in the above-referenced prior application, a cookie is created and stored by a browser each time the browser accesses and interacts with an authentication server.

Each cookie includes an expiration time value. If the client attempts to access a protected resource after the time represented by the expiration time value, the client must re-authenticate itself with the authentication server.

Although this approach provides a modicum of security, it is subject to attack. For example, a cookie can be copied and moved to another computer without authorization.

One workaround is to create cookies that have an expiration time of "0." Such cookies never expire, and are stored only in volatile memory at the client. Thus, security is improved. However, this approach is impractical, because it prevents the administrator of the system from limiting the amount of time after which a user is required to undergo authentication. Potentially, the user could be logged in and authenticated for an indefinite and perhaps unlimited period of time. Further, if the authenticated user leaves his or her workstation unattended, the user remains logged in, and an interloper could access the system without authorization.

Based on the foregoing, there is a clear need in this field for an improved way to manage client-server sessions in networks that use stateless protocols.

SUMMARY OF THE INVENTION

The foregoing needs, and other needs and objectives that will become apparent from the description herein, are achieved by the present invention, which comprises, in one aspect, a method of managing sessions in a stateless network system that includes a plurality of first servers each controlling access by one of a plurality of clients to resources of a plurality of second servers. In one embodiment, the method involves creating a session manager that is bound to the first server. One of the first servers receives a request of the client to obtain one of the resources of one of the second servers. The session manager determines from information stored therein whether the client is part of an authenticated session with any of the first servers. The session manager grants the client access to the resource only when the information in the session manager indicates that the client is part of an authenticated session.

In one feature, the determining step involves determining, at the session manager from information stored therein and based on a session identifier that is generated by the first server and provided to the session manager, whether the session identifier is valid; and granting the client access to the resource only when the session identifier indicates that the client is part of a valid session.

In another feature, the determining step involves determining, at the session manager from information stored therein and based on a session identifier that is generated by the first server and provided to the session manager, whether the session identifier is valid; determining, at the session manager, whether the client has failed to contact any of the first servers within a predetermined period of time; and granting the client access to the resource only when the session identifier indicates that the client is part of a valid session and the client has contacted at least one of the first servers within the pre-determined period of time.

Another feature relates to determining, at the session manager from information stored therein and based on a session identifier that is generated by the first server and provided to the session manager, whether the session identifier is valid; determining, at the session manager, whether the session identifier has been revoked; and granting the client access to the resource only when the session identifier indicates that the client is part of a valid, un-revoked session.

In another feature, the method includes creating and storing a plurality of session managers, each session manager being associated with at least one of the first servers, each session manager having a locally stored set of session information defining one or more valid sessions between the clients and the second servers; and synchronizing the session information of each of the session managers with the session information of all other session managers.

In still another feature, the method involves creating and storing a plurality of session managers, each session manager being associated with at least one of the first servers, each session manager having a locally stored set of session information defining one or more valid sessions between the clients and the second servers; when one of the session managers is created: receiving, at that session manager, a list of all other session managers that are online; synchronizing the session information of that session manager with each other session manager in the list; and storing information in that session manager indicating that it is online.

Yet another feature includes creating and storing, in association with each of the first servers, a monitoring element that monitors whether each of the first servers is bound to its associated session manager.

Yet another feature involves creating and storing a topology management element that communicates with all of the first servers and all of the session managers and determines whether each first server is bound to an associated session manager.

Still another feature includes the steps of creating and storing a topology management element that communicates with all of the first servers and all of the session managers and determines whether each first server is bound to an associated session manager; registering one of the first servers with one of the session managers by creating and storing, in association with each of the first servers, a monitoring element that monitors whether each of the first servers is bound to its associated session manager; registering each of the session managers with the topology management element.

According to another feature, the method includes creating and storing, in association with each of the first servers, a topology management element that monitors whether one of the first servers is bound to a first session manager; using the topology management element, detecting a failure of the first session manager; at the first server, binding the one of the first servers to a second session manager; monitoring, with the topology management element, whether the first server is bound to the second session manager.

In another feature, the method involves creating and storing, in association with each of the first servers, a topology management element that monitors whether one of the first servers is bound to a first session manager; using a first interceptor that is bound to the topology management element, detecting a failure of the first session manager, and in response thereto, deactivating the first session manager; using a second interceptor that is bound to the first server, detecting a failure of the first session manager, and in response thereto, at the first server, binding the one of the first servers to a second session manager; monitoring, with a third interceptor that is bound to the second session manager, whether the first server is bound to the second session manager.

In one embodiment, a user logs in to a system having protected resources. User login may occur when a user goes directly to an Access Server or because the user accesses a resource in a Protected server before login and a Runtime redirects the user to the Access Server. The Access Server authenticates the user. The Access Server communicates with an authentication mechanism that creates a session for that user in the Session Manager. The session is replicated to all other Session Managers. The User requests a resource in a Protected Server that has a Runtime. The Protected Server sends the user's session to the Session Manager for verification. As a result, multiple sessions are managed and controlled.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a block diagram of a protected server and its connections to the system of FIG. 1;

FIG. 3 is a block diagram of an access server used in the system of FIG. 1;

FIG. 4 is a block diagram of a session management system;

DETAILED DESCRIPTION OF THE PREFERRED EMBODIMENT

A method and apparatus for managing sessions in a stateless network system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Operational Context

Figure 1:
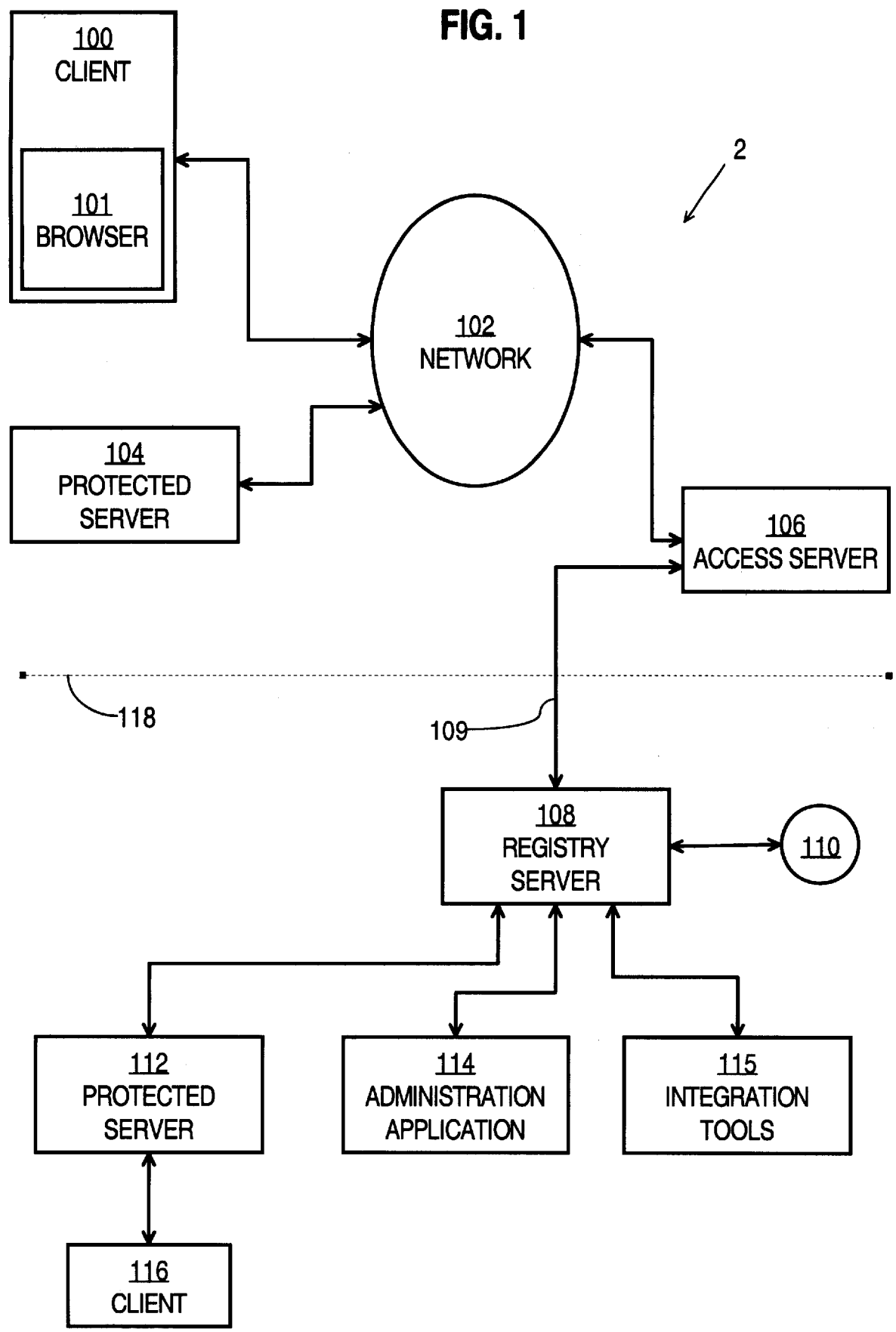
FIG. 1 is a block diagram of an information access system.

FIG. 1 is a block diagram of main elements of an information access system 2 according to a preferred embodiment. Generally, an information access system 2 comprises a plurality of components including an Access Server 106, Registry Server 108, Administration Application 114, and Integration Tools 115. The foregoing components cooperate to control access to resources stored on one or more Protected Servers 104, 112. Generally, each Protected Server is a Web server. Each component comprises one or more modules. Each module provides one or more services to users of the system 2 and administrators. There may be any number of Protected Servers 104. Users are individuals who have a relationship with an organization and play various roles, and are registered in the system 2. Users may be members of an organization, or may be customers, suppliers, or business partners of the organization. Administrators control the system.

In one embodiment, all the components are stored on and executed by one physical server or computer. In alternate embodiments, one ore more components are installed on separate computers; this approach may improve security and performance. For example, Registry Server 108 may be part of a secure Intranet that is protected using a firewall 118, and Access Server 106 may be located on an extranet for access by users inside and outside the enterprise. Further, there may be more than one Registry Server 108 in a mirrored or replicated configuration. Each Access Server 106 may be coupled to more than one Registry Server 108, so that a particular Access Server 106 can communicate with a second Registry Server 108 if a first one is busy or unavailable. Each Registry Server 108 may be coupled to or support more than one Access Server 106. Each Registry Server 108 may execute operations using multiple execution threads, in which access of each thread to Registry Repository 110 is managed by the Access Control Library.

A browser 100 is coupled by a communication link to a network 102. The block shown for browser 100 represents a terminal, workstation computer, or an equivalent that executes a standard Web browser program or an equivalent, such as Netscape Navigator, Internet Explorer, or NCSA Mosaic. Network 102 is a compatible information communication network, preferably the Internet. In alternate embodiments, the browser 100 is a client process or client workstation of any convenient type, and the network 102 is a data communication network that can transfer information between the client and a server that is also coupled to the network.

The system 2 enables organizations to register information sources or Resources and register Users of the information in a central repository. A Resource is a source of information, identified by a Uniform Resource Locator (URL) and published by a Web server either in a static file formatted using Hypertext Markup Language (HTML) or in a dynamically generated page created by a CGI-based program. Examples of resources include a Web page, a complete Web site, a Web-enabled database, and an applet.

The system 2 enables administrators to implement access rules by defining Roles that Users play when working for an organization or doing business with an enterprise. A Role may reflect a relationship of a User to the organization (employee, customer, distributor, supplier), their department within an organization (sales, marketing, engineering) or any other affiliation or function (member of quality task force, hotline staff member) that defines their information needs and thus their access rights or privileges. Thus, examples of Roles include Employee, Customer, Distributor, Supplier, Sales, Marketing, Engineering, and Hotline Staff.

Roles are defined by information identifying a name of a role and by a functional group in which the role resides. A functional group is often a department in which similar functions exist. Examples of functional groups are Marketing, Sales, Engineering, Human Resources, and Operations.

In some embodiments, the term User Type or Person Type refers to employees, directors, officers, contractors, customers, distributors, etc., and Role refers to a job function such as sales representative, financial analyst, etc.

Roles determine what resources a User can access. Further, each role may require a unique set of information that is available in resources. For example, a User who is an Employee in the Marketing department could access Price List and New Products Resources. Thus, system 2 enables the creation of resource profiles by assigning roles to resources, and user profiles by assigning roles to users to generate access rights. System 2 automatically links a user profile to the resources profiles that have been assigned the same roles, so that deployment of new resources may occur rapidly.

Roles and resources are owned by Functional Groups within the organization.

The system 2 makes managing access simple because it is based on an additive data model. Assigning a role to a user or deleting a role from a user can add or delete access to all resources with that role. Similarly, adding a role to a resource or removing a role from a resource can give or take away access to that resource from all users with that role. The system 2 allows administrators to make such changes in a simple manner, resulting in significant administration time savings.

The system 2 also enables Users to log-in to the system once, and thereafter access one or more Resources during an authenticated session. Users may log in either with a digital certificate or by opening a login page URL with a web browser and entering a name and password. In the past, users have had to log in individually to each Web application that they are authorized to use. In the preferred embodiment, users always access the same login page regardless of the number of resources to which they need access. Thus, the system provides a mechanism of single secure log-in to Web resources.

If the login attempt is successful, the system 2 presents the User with a Personalized Menu that assists the User in identifying and selecting a Resource. In one embodiment, a Personalized Menu is an HTML page containing a list of authorized Resources. The Personalized Menu displays only Resources to which the User has access. The User can then select and access a Resource.

Protected Server 104 is coupled to the network 102 logically separate from browser 100. The Registry Server 108 is coupled to a Registry Repository 110 that stores information about users, resources and roles of the users. Registry Server 108 is coupled by a secure communication link 109 to Access Server 106, which is coupled to network 102. Registry Server 108 has an Authentication Server Module that manages concurrent access of multiple users or browsers 100 to Registry Repository 110.

A Protected Server 112 is coupled to Registry Server 108. The Protected Server 112 executes or supervises execution of an Administration Application 114, which functions to register and manage users, resources and roles by reading and writing information to or from Registry Repository 110.

Integration Tools 115 are selectively executed on Protected Server 112 and function to customize the particular configuration of the foregoing components. For example, Integration Tools 115 are use to customize the form or content of screen displays presented to browser 100 for user login and logout, or to enforce password selection rules. Integration Tools 115 also function to integrate resources with the foregoing components and to integrate data stores or directories with Registry Repository 110.

Access Server 106 stores a log-in page, Authentication Client Module and Access Menu Module. The Authentication Client Module authenticates a user by verifying the name and password with the Registry Server 108. If the name and password are correct, the Authentication Client Module reads the user's roles from the Registry Server 108. It then encrypts and sends this information in a "cookie" to the user's browser. A "cookie" is a packet of data sent by web servers to web browsers. Each cookie is saved by browser 100 until the cookie expires. Cookies received from a web server in a specific domain are returned to web servers in that same domain during open URL requests. A cookie returned by the Authentication Client Module is required for access to resources protected by system 2.

Once a user has been authenticated, the Access Menu Module of the Access Server returns a Personalized Menu of the type described above.

When the user selects a resource, the browser sends an open URL request and cookie to a Protected Web Server. A Protected Web Server is a web server with resources protected by the Runtime Module. The Runtime Module decrypts information in the cookie and uses it to verify that the user is authorized to access the resource. The cookie is also used by the resource to return information that is customized based on the user's name and roles.

The Registry Server contains an Authentication Server Module and a Registry Repository. The Authentication Server Module is structured as a Java server. The Registry Repository is structured as a database. For example, the Registry Repository may be an SQL Server relational database management system, the Oracle7® database, etc. The Registry Server also contains an Access Control Library that is structured as a Java library.

The Administration Application contains Administration Application Modules, a Runtime Module, and an Access Control Library. The Administration Application Modules are structured as one or more HTML pages, CGI-based Java programs, or applets. The Runtime Module is structured as a C/C++ web server plug-in. The Integration Tools may comprise an Access Control Library, and sample program source code. Preferably, the source code is written in the Java® language.

The Access Server comprises an Authentication Client Module, Access Menu Module, Runtime Module, and an Access Control Library Lite. The Authentication Client Module and Access Menu Module are structured as one or more HTML pages or CGI-based Java programs. The Access Control Library Lite is one or more software components that interact to control access to the Access Server and its resources. The term "Lite" indicates that the access control components provide more limited functions, and are therefore more secure, than an Access Control Library.

The Protected Web Server comprises a Runtime Module and an Access Control Library. The Runtime Module and Access Control Library are reused by several components, for example, the Runtime Module is used to protect resources on Protected Web Servers and system resources in the Access Server and Administration Application.

Session Management Mechanism

Functional Overview

A system for managing sessions in a stateless network system is provided. The World Wide Web and the Internet are examples of stateless network systems. The communication protocols used by these systems are asynchronous and transactional. They do not provide a way to carry state information about a session between a client and server.

In one embodiment described herein, each Protected Server 106 is associated with one or more session management servers. The session management servers implement three (3) major functions.

1. Idle Timeout. An administrator may select a pre-defined idle timeout value that is associated with a user. If a client fails to contact any Protected Server in the system for longer than the idle timeout value, the client is logged out and must re-authenticate itself in order to access resources that are protected by any Access Server.

2. General Timeout. The administrator may select a general timeout value. The general timeout value is a pre-determined period of time, after which the client is forced to log out and must re-authenticate itself, regardless of the number of times the client has interacted with a protected server or other element of the system.

3. Revocation. The administrator may revoke the authentication of a client or user at any time.

Structural Overview

FIG. 4 is a block diagram of an embodiment of a session management system 400.

As in FIG. 1, client 100 executes browser 101 and communicates with one or more Access Servers 104A, 104B, directly or indirectly through network 102. Each Runtime 406A, 406B of each Protected Server 104A, 104B is coupled to a Session Manager 420A, 420B which provides session management services to the Runtimes 406A, 406B, respectively. Optionally, a Session Manager may be coupled to an Authentication Mechanism 422, as illustrated in the case of Session Manager 420A. Session Managers 420A, 420B are also called "Session Manager objects."

The Protected Servers normally are organized in a domain that is associated with one particular Runtime 406A, 406B. When an Protected Server 106 initializes, it registers itself with a Session Manager 420A, 420B by requesting a Session Manager from a Topology Mechanism 440, which is described further herein. In response, a Session Manager is assigned to the Protected Server.

The Session Manager with which it is registered notifies the Topology Mechanism 440 that the registration has occurred. The registration information can be passed to other Session Managers.

More than one Session Manager 420A, 420B may operate at any particular time. There may be any number of Session Managers. Each Session Manager can interact with one or many sets of session information. Each Session Manager 420A, 420B may comprise a replicated version of a master Session Manager that is maintained by Session Manager Server 435, and each replica may operate in synchronization with all other replicas. Session Manager Server 435 may comprise a wrapper for CORBA objects such as the Session Managers 420A and 420B.

An administrator of the system may create and activate Session Managers 420A, 428B at any time. In a preferred embodiment, two Session Managers are created and active at any given time, thereby providing redundancy in the event of a system crash. It is desirable to create and activate each successive Session Manager during a period of lower network activity.

More than one Access Server 104A, 104B may be managed by each Session Manager 420A, 420B. Further, a particular Access Server 104A, 104B may be bound to more than one Session Manager 420A, 420B.

Each Session Manager 420A, 420B may be implemented using one or more programmatic objects created using an object-oriented programming language, such as Java®. The Session Managers may communicate with database 450 using a standard set of programming methods and protocols, such as JDBC.

Database 450 maintains a list of sessions. All Session Managers 420A, 420B know the list of sessions. In one implementation, the list is kept in memory, and any change to a session is broadcast to all Session Managers. Alternatively, the list of sessions may be maintained in a database table. Database replication may be used to provide redundancy. Each Session Manager may be located in the same computer as the computer that hosts the database.

A Logging Service 430 may be coupled to each of the Session Managers 420A, 420B. The Logging Service 430 receives information about the actions taken by the Session Managers and records such information in one or more logs. If a session is removed from memory, an administrator can determine what happened to the session information by reviewed the logs. Preferably, Logging Service 430 is called to log exceptions; session creation; session revocation; session revocation by administrator; and session revocation due to idle timeout. Each log comprises a plurality of records. Each log record includes a session identifier and information identifying the client that caused the logged event.

Topology Mechanism 440 is coupled to each of the Session Managers 420A, 420B and to the Logging Service 430. The Topology Mechanism 440 keeps track of all the Session Managers or replica that are in existence at any given time. To do this, the Topology Mechanism 440 stores information identifying each Session Manager that exists, and information identifying each Access Server that is associated with or bound to that Session Manager.

In the preferred embodiment, Topology Mechanism 440 is implemented in the form of an object compliant with the Common Object Request Broker Architecture (CORBA) that can monitor other objects in the system. Its monitoring capabilities may be implemented based on Interceptor objects, which are part of the commercially available Visibroker ORB system. Interceptors are add-ons to existing objects. Logically, they are located between a client to an object and the object itself. Interceptors allow a system to track connections and messages to objects.

In the Topology Mechanism 440, an Interceptor is instantiated each time a Session Manager 420, 420B binds to the Topology Mechanism. When a Session Manager object is started, it connects to the Topology Mechanism, registers itself, and sets its state. In response, the Topology Mechanism installs an Interceptor for that Session Manager object. If a session connection is dropped, the Topology Mechanism detects the drop and sets the state value of the Session Manager object to Down. These mechanisms are described further herein.

The Session Managers may be organized in one or more clusters and there may be one Topology Mechanism for each cluster that keeps track of each of the Session Managers that are in that cluster. Normally the Topology Mechanism does not actively contact Session Managers, except in response to a request for information from a Session Manager, or in response to a Session Manager going offline.

Session management in the system 400 is carried out with respect to sessions between clients such as client 100 and servers such as Protected Server 104, 112. Each session between a client and a server is represented by a set of session information. The session information preferably comprises: an initial session identifier value; an initial access time value; a last access time value; a user identifier value or key; a general timeout value; and an idle timeout value.

Preferably, the session identifier value is a pseudo-random number. For example, the session identifier value may be created using a random number generator that receives a current time value as a seed. The session identifier may include a prefix value that is a predetermined value uniquely associated with a particular Session Manager 402A, 402B, followed by a random number value. This arrangement is preferred because it ensures that no conflict arises in the event that more than one Session Manager 402A, 402B generates the same random number value at the same instant in time. In addition, this arrangement ensures that no conflict arises in the event that more than one Session Manager 402A, 402B located in different domains create the same random number value at the same instant in time.

Each of the time values comprises numeric values representing day, month, year, and time of day.

The user identifier may be a scalar value such as a user name string. Alternatively, the user identifier may be a unique numeric value that may be used as an indirect reference to a database of user name and password information.

The session information may be stored in volatile memory or in a persistent storage medium. The session information may be retained only for a limited period of time, for example, one hour. Preferably, the session information is associated and stored in a session object that is managed using a CORBA-compliant Object Request Broker (ORB), such as the Inprise CORBA ORB. However, this method of representing the session information is not required, and any other form of information representation may be used. It is preferred to store session objects in memory for a pre-determined period of time, such as one hour, so that they do not need to be re-created if the user initiates a connection or session during that period after a period of idleness.

The general timeout value and the idle timeout values are pre-set at pre-determined values by the system administrator, and their use is described further herein.

Initialization and Startup

Figure 5A:
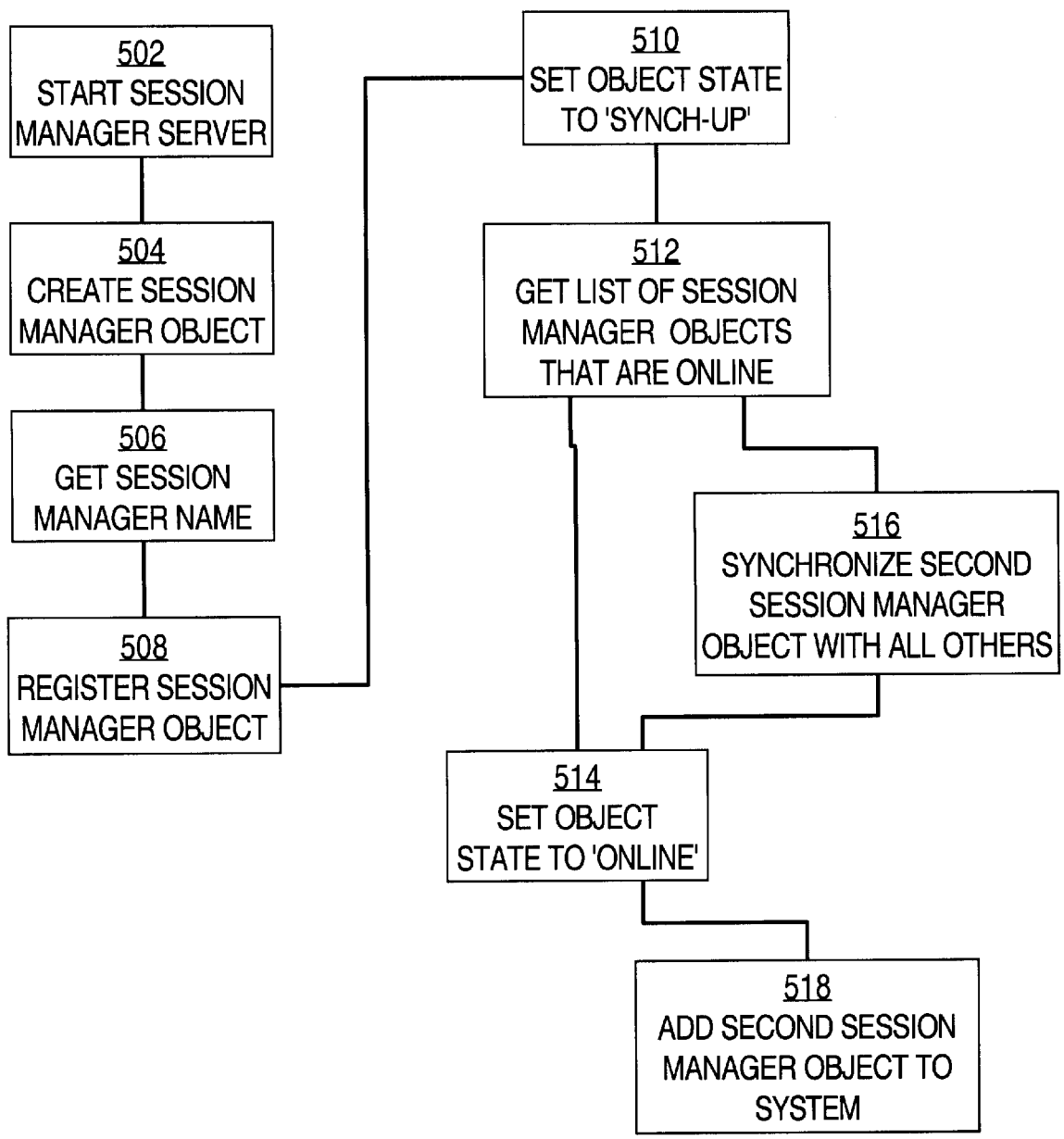
FIG. 5A is a flow diagram of a method of starting a session management system and registering a one or more session managers.

FIG. 5A is a flow diagram of steps carried out by the system when a new Session Manager is created or instantiated. Preferably, elements of the system are started in the following order: Logging Service; Topology Mechanism; Session Managers; Runtimes;. Each Session Manager is created by the system administrator.

In block 502, a Session Manager server starts operating. Block 502 may involve a plurality of initializing steps. For example, the Session Manager server initializes an Object Request Broker that will manage creation of programmatic objects that are used by the Session Manager. The Session Manager determines whether it needs to operate in a secure mode, for example, according to the Secure Sockets Layer (SSL) protocol. The Session Manager connects to the Logging Service 430.

In block 504, a session manager object is created or instantiated by the session manager server. In this description, the terms "session manager object" or "current Session Manager object" are equivalent to "Session Manager" and represents the executable, runtime embodiment of the session management mechanisms described in this document.

In block 508, the Session Manager contacts the Topology Mechanism 440 and requests a name to be used for the Session Manager. In response, Topology Mechanism 440 generates a name and communicates the name to the Session Manager.

In block 510, the Session Manager registers itself in the system. In one embodiment, a state of the Session Manager is set to "synch up," as indicated by block 510. The current Session Manager object sends a message to the Session Manager server to request a list of all other session manager objects that currently exist in memory, as indicated by block 512.

If there are no other Session Manager objects, then the state of the current Session Manager object is set to "online," as indicated by block 514, and initialization processing of the current Session Manager object is complete.

If there are other Session Manager objects active, which will happen when the current Session Manager object is the second or subsequent Session Manager to be created, then the current Session Manager object enters a power-up state. The new Session Manager needs to receive information about the number and location of existing Session Managers, so that the new Session Manager can distribute its session information to the existing Session Managers. In the power-up state, the current Session Manager synchronizes itself with all other currently existing Session Managers, as indicated by block 516. For example, the second or subsequent Session Manager object contacts each other Session Manager that currently exists and requests an update of session management from it. In response, the other Session Manager provides a copy of its session management information to the current Session Manager. As a result, the current Session Manager is updated with all values of all other Session Manager objects.

In one embodiment, Topology Mechanism 440 provides synchronization information to a new Session Manager. In block 516, the Session Manager contacts the Topology Mechanism 440 to obtain a list of existing Session Managers in the cluster managed by the Topology Mechanism. The new Session Manager then contacts each of the existing Session Managers in turn, and requests all existing session information from that Session Manager. In this way, all Session Managers in the cluster become synchronized. In addition, the Topology Mechanism 440 tracks each connection of a Session Manager to a Runtime. If a Session Manager or any associated Runtime crashes, then the Topology takes corrective action, as further described below.

During the power-up state, if a Runtime 406A, 406B begins operating and connects with the current Session Manager, then the current Session Manager informs the Runtime that the Session Manager cannot respond to a request of the Runtime. However, the information received from the Runtime is stored in one or more buffers. When the current Session Manager is fully updated with all values of the other Session Manager objects, the current Session Manager checks its buffers to determine whether new information needs to be added to itself. If so, it updates itself with that information. In addition, the information in the buffers is communicated to the other Session Manager objects.

After the current Session Manager is updated from the other Session Manager objects and its buffers, it enters the online state, as indicated by block 514. In block 518, the current Session Manager object is added to the system. The Session Manager broadcasts a message to all other Session Managers to indicate that the current Session Manager object is ready for use. This causes the other Session Managers to synchronize themselves to the newly created Session Manager.

Figure 5B:
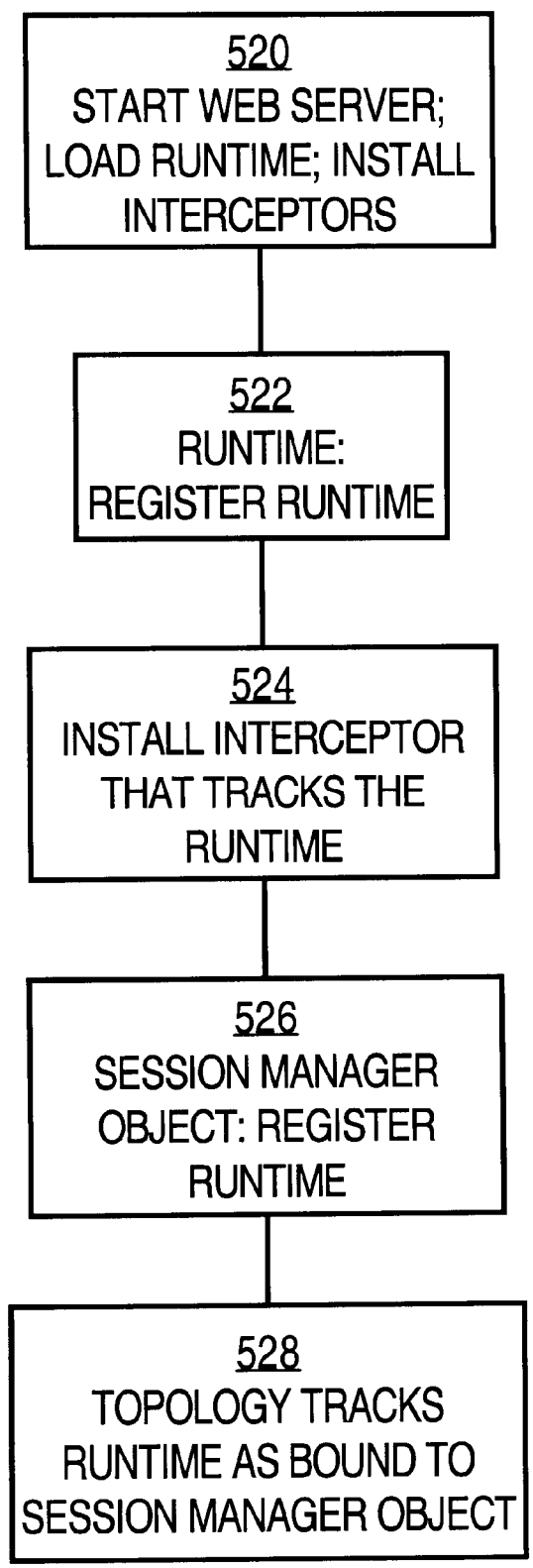
FIG. 5B is a flow diagram of a method of starting a session management system in which a runtime is registered.
Figure 5C:
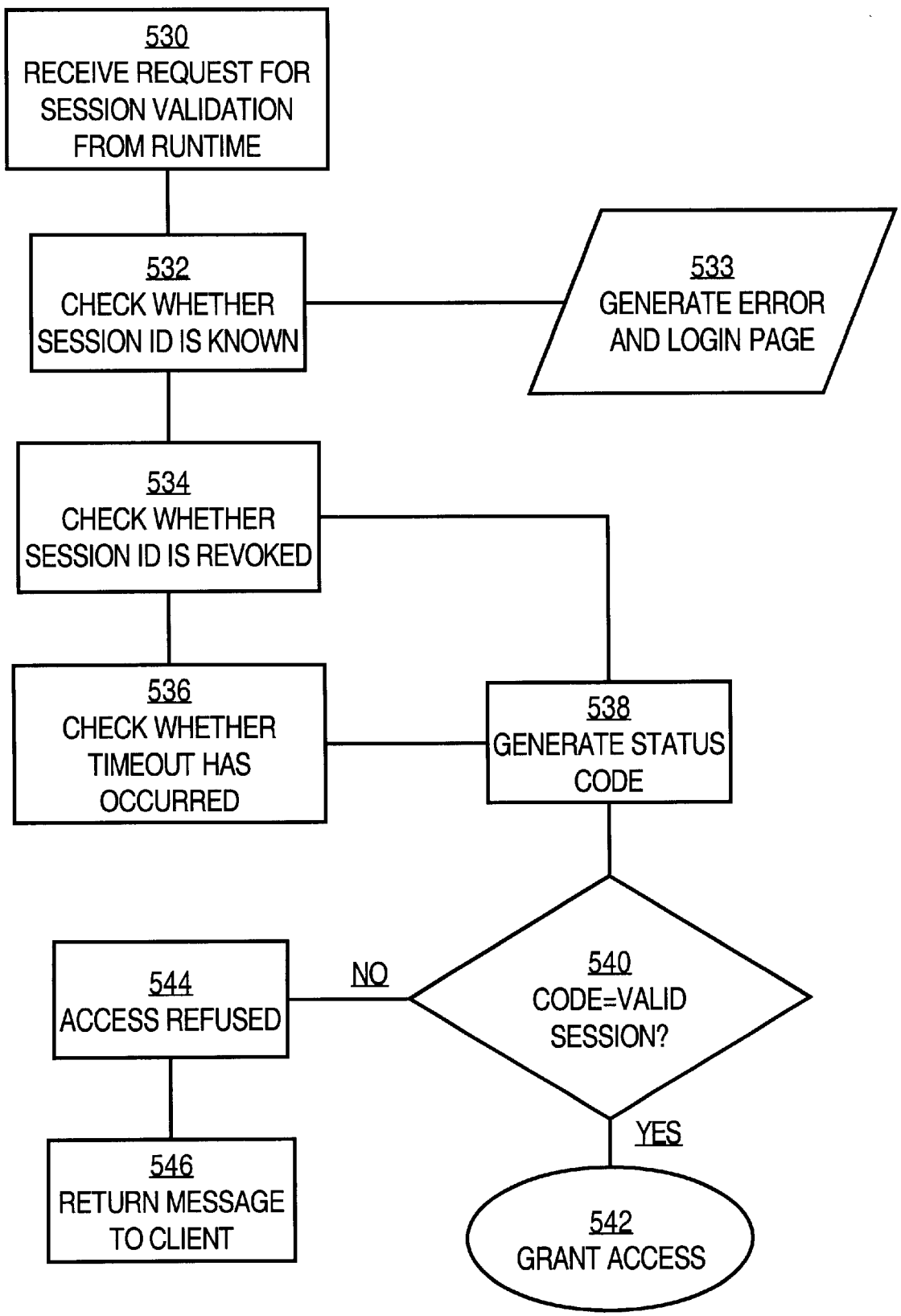
FIG. 5C is a flow diagram showing session manager operation.

FIG. 5B is a flow diagram of a method of starting a session management system in which a runtime is registered. The method of FIG. 5B is carried out when the Topology Mechanism 440 and at least one Session Manager object are initialized, online and ready to receive requests.

In block 520, a protected Web server starts, its associated Runtime is loaded, and an Interceptor object for the Runtime is loaded. Block 520 may involve installing a Client Event Handler of an ORB, such as Visibroker.

In block 522, the Runtime attempts to register itself with an associated Session Manager object that is installed and running. When a Session Manager object is found, the Session Manager object binds the Runtime to it. Further, the Session Manager object installs an Interceptor object that tracks its connection to the Runtime, as shown in block 524.

In block 526, the Session Manager object attempts to register the Runtime with the Topology Mechanism. The Topology Mechanism records information that associates the Runtime with the Session Manager object that has requested registration. As a result, the Topology Mechanism may track the Runtime, as shown in block 528.

Run Time Operation of Session Managers

As indicated above, when a Runtime 406A, 406B connects to a Session Manager object 420A, 420B, it registers itself with the Session Manager object. When Client 100 requests an electronic document from a Protected Server, the request arrives at the Runtime. In response, the Runtime sends a message to the Session Manager object with which the Runtime is registered. The message requests validation of a session between the client and the Protected Server, and contains session information including a Session Identifier value ("Session ID"), as shown in block 530.

The Session Manager object takes the Session ID and performs checks on it. For example, as shown in block 532, the Session Manager object checks to determine whether the Session ID is recognized or known, by searching a local hash table of the Session Manager object to find the Session ID. If the Session ID is not found in the local hash table, then an internal error is generated, and a login page is returned to Client 100, as indicated by block 533. Thereafter, to gain access to the Protected Server, the Client 100 must provide valid username and password information through the login page to the Access Server. This prevents malicious users or processes from entering the system using an invalid Session ID.

In block 534, the Session Manager object checks to determine whether the Session ID has been revoked. Revocation may occur, for example, because a session has terminated, or as a result of action by an administrator to intentionally revoke the session.

In block 536, the Session Manager object also checks to determine whether an idle timeout or general timeout has occurred with respect to the current Session ID, by comparing the timeout values to a last access time value that indicates the last time that the client used an Access Server.

Based upon the results of the checks of block 534 and block 536, a status code value is created and stored, as shown by block 538. The status code value indicates the status of the session associated with the Session ID. After the checks are complete, in block 540, the status code value is tested to determine whether a valid session exists. For example, the status code value may correspond to an Online state. In the Online state, the request of Client 100 is permitted to go through the system and the client may access the Protected Server and its resources, as indicated by block 542, in which access is granted.

Otherwise, based on the status code, access is refused, and a message is sent to the client that explains why the client is not permitted to access the requested resource, as shown by block 544 and block 546. The message may be in the form of an electronic document, such as an HTML page that can be displayed by Browser 101. The specific content of the electronic document may be established by the system administrator. In the case of an idle timeout event, the electronic document could comprise an HTML page stating, "Cannot Access Protected Resource (Session Idle Too Long)," or a similar message. The electronic document is created and sent to the client by the Runtime 406A, 406B upon receipt of the status code value from the Session Manager 420A, 420B.

In the preferred embodiment, each Session Manager object implements methods that carry out these and other functions, including:

put—Adds a new session to the database 450.

deleteSession—Deletes a session from the database.

updateSession—Updates the session.

get—Returns session information.

revokeUser—Revokes all sessions that are associated with a particular user, based on a user identifier value.

getNumberOfSessions—Returns a list of all sessions that are managed by the Session Manager, including information indicating the status of each session, such as Revoked, Expired, etc.

purgeSessions—Removes Revoked and Expired sessions.

synchSessionList—Synchronizes the information managed by the Session Manager with the contents of all the other Session Managers.

Timeout Processing

Each time that a Runtime 406A, 406B contacts one of the Session Managers 420A, 420B with respect to a particular session, the Session Manager updates the Last Access Time value associated with the session information for that session. The Session Manager then notifies all other active Session Managers and provides the updated time value.

Such notification facilitates security of the system. For example, assume that the Idle Timeout value is set to "15 minutes." Client 100 obtains a resource that is protected by Protected Server 104A, and in the course of obtaining it, Client 100 is authenticated in the system. Runtime 406A notifies Session Manager 420A that it is conducting a session with Client 100. A new set of session information is created by Session Manager 420A. Session Manager 420A stores the current time in the Last Access Time value of the set of session information that is associated with the current session between Client 100 and Runtime 406A. Session Manager 420A notifies Session Manager 420B to update the Last Access time value in the replicated session information that it stores for the same session.

Client 100 then requests a protected resource from Protected Server 104B. Runtime 406B updates the Last Access Time value, and provides it to Session Manager 420A, which also updates its copy of the Last Access Time. Assume that Client 100 actively works with resources managed by Protected Server 104B for more than 15 minutes, and then returns to Access Server 104A to obtain one of its protected resources. Since the Last Access Time value is updated by Session Manager 420B each time Client 100 interacts with Access Server 104B, Session Manager 420A determines that Client 100 is active and may interact with Protected Server 104A to access its resources.

However, if the Session Managers did not communicate with one another to update session information, Session Manager 420A would determine that Client 100 last contacted it more than 15 minutes ago, and an Idle Timeout error would occur. Client 100 would be required to re-authenticate itself before Access Server 104B could grant access to its protected resources.

Alternatively, in this example Session Manager 420B could contact Session Manager 420A and obtain the Last Access Time value for the current session only when the Client 100 contacts Session Manager 420B. However, if the link between Session Manager 420A and Session Manager 420B was busy, down, or unavailable, Session Manager 420B would be unable to obtain such information.

Purging Inactive Session Information

The Topology Mechanism 440 also sends one or more Purge Session messages to the Session Managers. In one embodiment, Purge Session message is sent after expiration of a pre-determined time period, for example, 60 minutes. In response, each Session Manager will delete from its storage media any session information that is older than the predetermined time period.

Periodically, it is desirable to purge or delete inactive sessions from memory. In this context, "inactive" refers to a Session Manager that has become expired and has not been revived as a result of a later client request. Accordingly, Topology Mechanism 440 may generate a Purge Session message and communicate it to one or more of the Session Managers. In response, a Session Manager that receives the Purge Session object is deleted from memory and the memory it occupied is recovered.

In the preferred embodiment, Topology Mechanism 440 generates a Purge message at a predetermined time interval, for example, every 60 minutes. The Purge message deletes only Sessions that became expired longer than a second predetermined period of time in the past, for example, 15 minutes.

Crash Processing

Figure 6A:
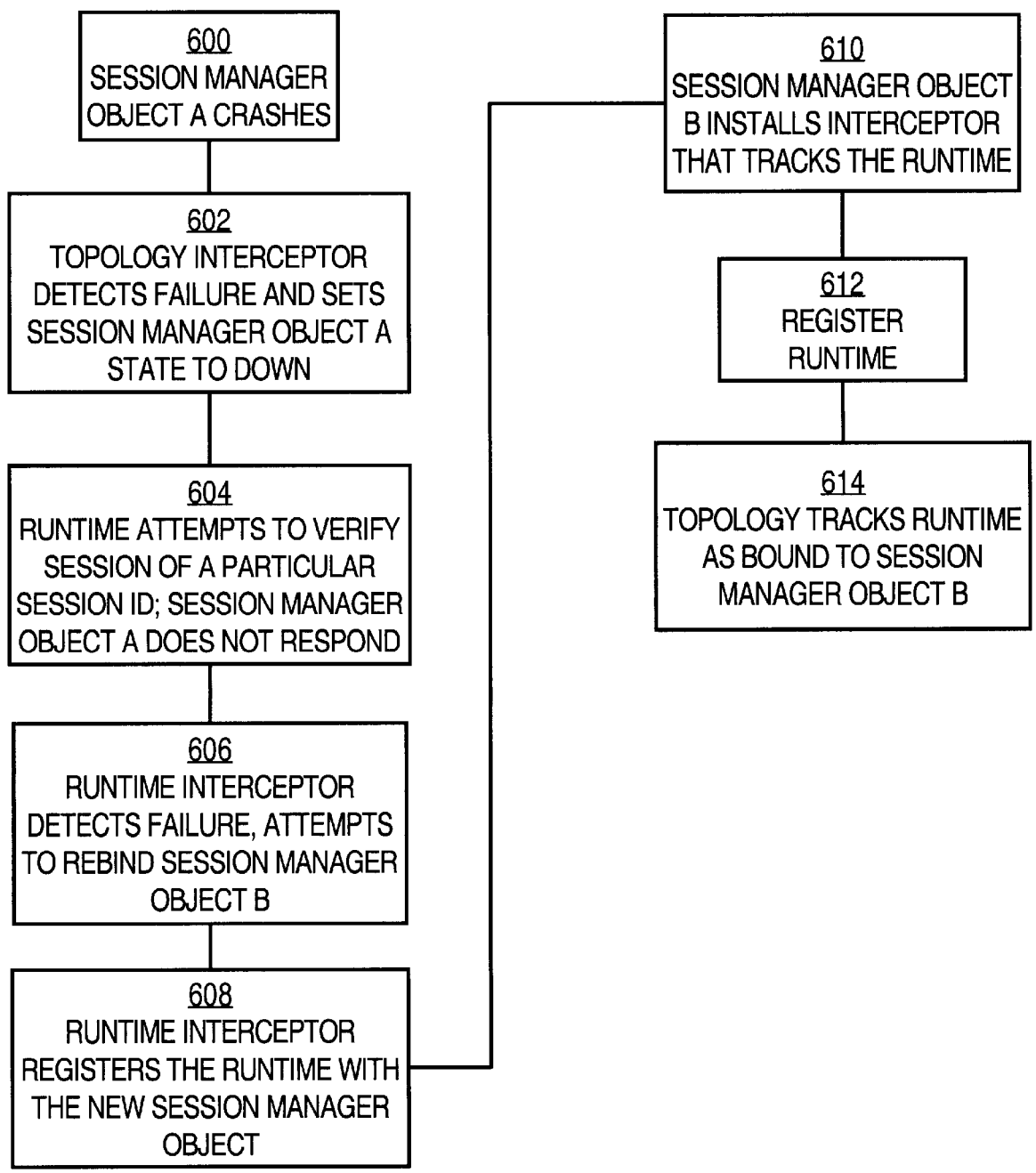
FIG. 6A is a flow diagram of a method of processing a failure of a first session manager.

FIG. 6A is a flow diagram of a method of processing a failure of a first Session Manager. Generally, if any particular Session Manager crashes or goes offline, the Topology Mechanism notifies all other Session Managers in its cluster. In response to such crash notification, each active Session Manager discontinues communicating with the crashed Session Manager.

Assume that a session management system includes a first Session Manager object "A" and a second Session Manager object "B," both of which are initialized, synchronized and running.

Assume further that Session Manager object A crashes, as shown in block 600. The Interceptor object of the Topology Mechanism that is associated with that Session Manager object detects the failure of the Session Manager object, and sets the state of Session Manager object A to DOWN, as shown in block 602. Further, the Topology Mechanism instructs all other Session Manager objects in the cluster managed by the Topology Mechanism to delete any reference to the crashed Session Manager object. This prevents the remaining Session Manager objects from subsequently attempting to synchronize to the crashed Session Manager.

In block 604, the Runtime managed by Session Manager object A attempts to verify a session associated with a particular Session ID, by contacting the Session Manager object A. This may occur, for example, when a client requests an electronic document that resides on a Protected Server that is protected by the Runtime. Since Session Manager object A has crashed, it does not respond to the Runtime.

In block 606, an Interceptor object associated with the Runtime detects the failure of the session verification request. In response, the Interceptor object attempts to re-bind the Runtime with another active, available Session Manager, such as Session Manager object B.

Assume that that the re-bind operation succeeds. The Runtime Interceptor object registers the Runtime with the Session Manager object B, as shown by block 608. In response, Session Manager object B installs an Interceptor object that tracks its connection to the Runtime, as shown by block 610. Session Manager object B then registers, with the Topology Mechanism, its connection to the Runtime, as shown by block 612. Thereafter, the Topology Mechanism will track the Runtime as bound to Session Manager object B, as indicated in block 614.

Figure 6B:
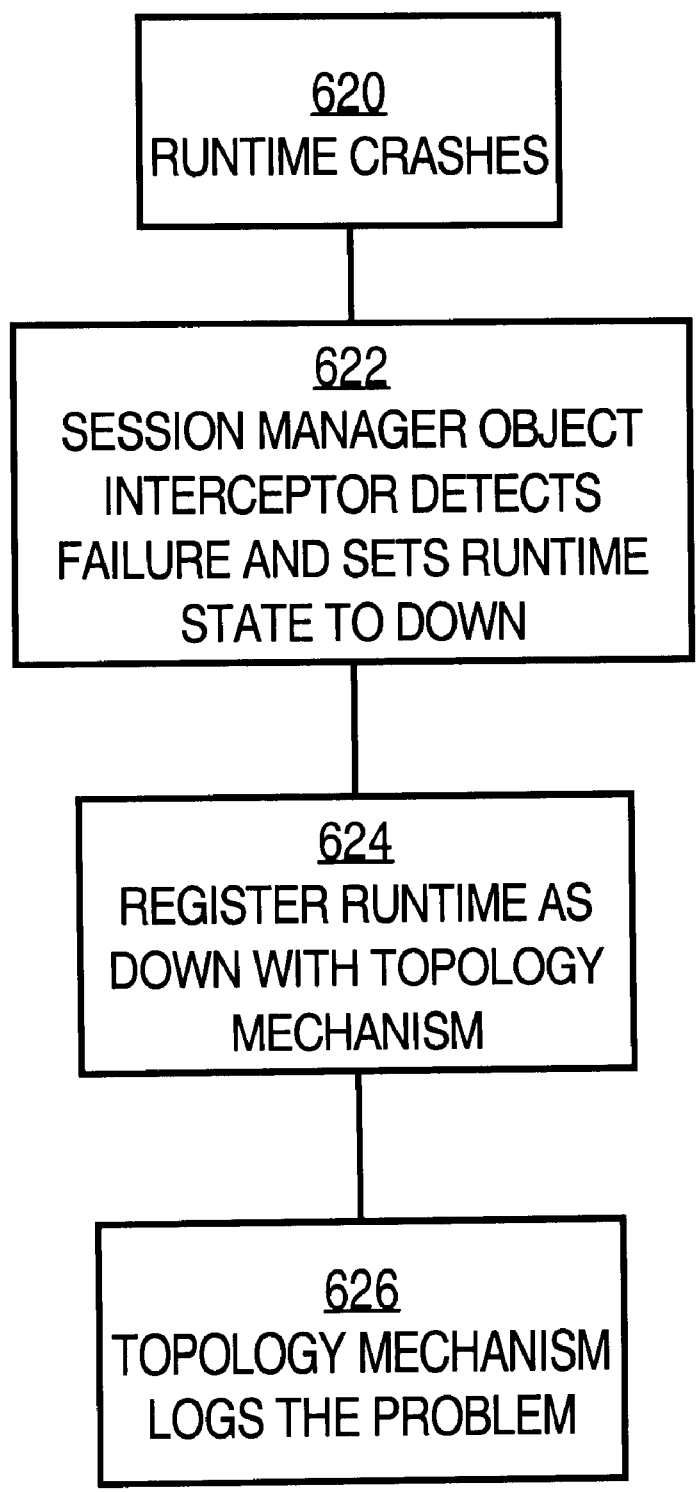
FIG. 6B is a flow diagram of a method of processing a failure of a runtime.

FIG. 6B is a flow diagram of a method of processing a failure of a runtime.

Assume that a Runtime is bound to a Session Manager object, and both are initialized, online, and running. Assume further that the Runtime crashes, as shown in block 620. In response, the Interceptor object attached to the Session Manager object associated with the crashed Runtime will detect the failure. The Interceptor sets a state value associated with the Runtime and stored in the Session Manager object to DOWN, as indicated by block 622. Further, as shown in block 624, the Session Manager object contacts the Topology Mechanism and registers the Runtime as down. In response, the Topology Mechanism logs the problem, as indicated by block 626.

Figure 6C:
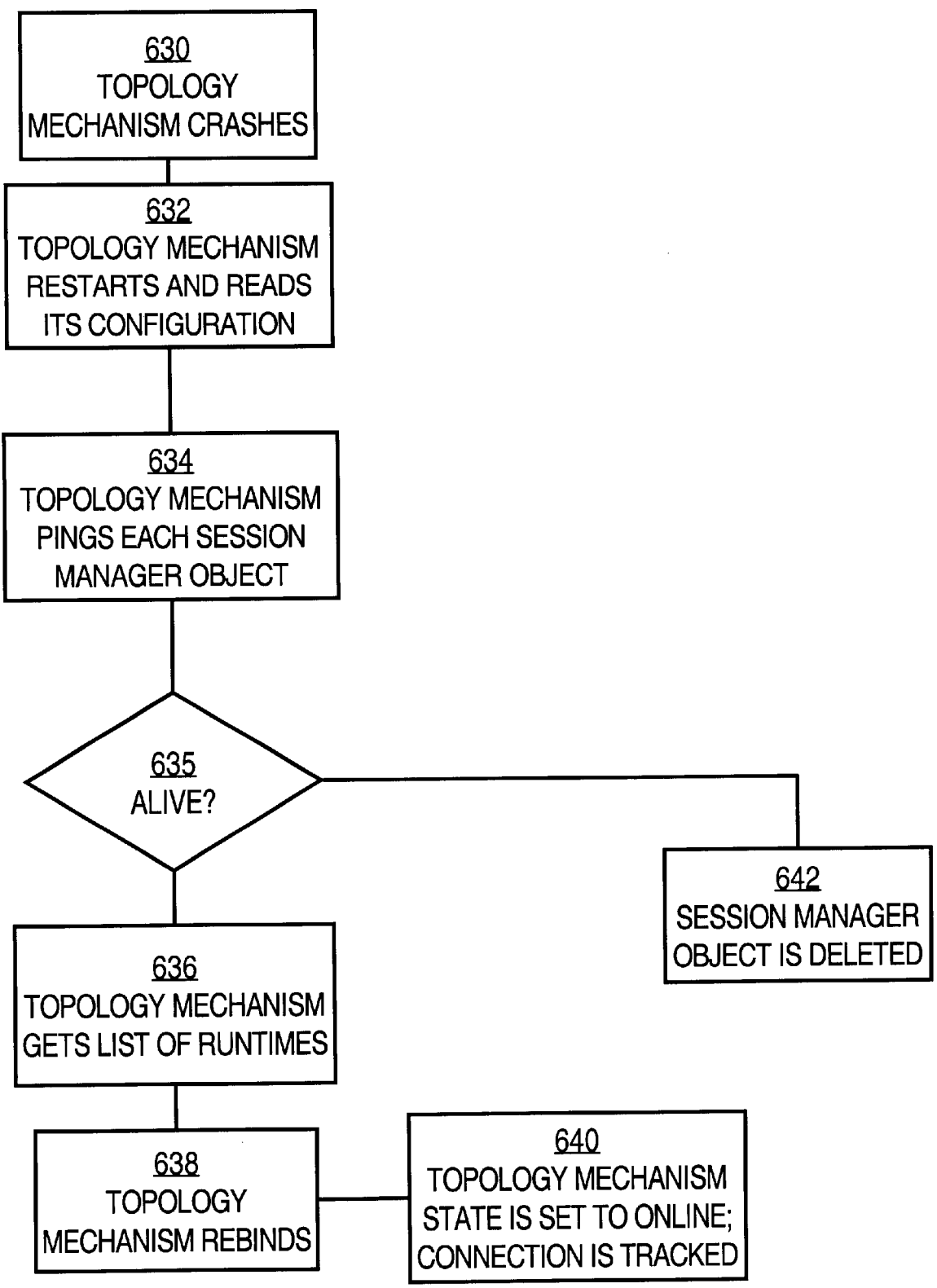
FIG. 6C is a flow diagram of a method of processing a failure of a topology mechanism.

FIG. 6C is a flow diagram of a method of processing a failure of a topology mechanism. Generally, when the Topology Mechanism 440 crashes, no new Session Manager object may start or initialize. The system will operate in a degraded state. If a Session Manager object crashes, the other Session Manager objects cannot be notified until the Topology Mechanism re-starts. Runtimes can start-up normally. Sessions cannot be purged.

Assume that at some point in operation of the system, the Topology Mechanism crashes, as shown in block 630. The Topology Mechanism is then re-started, and reads its configuration from a configuration file, as indicated by block 632.

The Topology Mechanism then locates each Session Manager object and asks whether it is currently active, or "pings" the Session Manager object, as shown in block 634. The Topology Mechanism tests whether each Session Manager object responds with an indication that it is "alive" and active, as shown by block 635. If a particular Session Manager object is not active, then the Topology Mechanism deletes any reference to that Session Manager object in the Topology Mechanism's binding information, as shown by block 642. Block 642 may also involve broadcasting a message to all other Session Manager objects indicating which Session Manager objects have crashed and have been deleted.

If the Topology Mechanism reaches an existing Session Manager object that is active, as shown in block 636, then the Topology Mechanism requests and obtains from the Session Manager object a list of Runtimes that are bound to that Session Manager object. Using this information, the Topology Mechanism rebuilds its internal binding information that associates Session Managers with Runtimes, as shown by block 638. The state of the Topology Mechanism is then set to "online" and it resumes tracking connections. The Topology Mechanism attempts to contact every Session Manager object that was online before it crashed.

Graphical User Interface

The information that is stored and managed by the Topology Mechanism 440 may be created and revised using a graphical editing mechanism. The graphical editing mechanism may display, in text or symbols or a combination, each Access Server and its binding, mapping or relationship to each Session Manager; each binding, mapping, or relationship of a Session Manager to the Topology Mechanism; the amount of traffic that has been handled by each Session Manager; and related information. Such statistical information may be useful for a system administrator to determine whether to create a new Session Manager.

Using the graphical editing mechanism, a system administrator may create a new Session Manager, which may be symbolically represented in the display after it is created. The system administrator may use graphical control devices, such as a mouse or trackball, to drag and drop connections from one or more Access Servers to the new Session Manager symbol. In this way, the system administrator may create new bindings or mappings, or revise existing bindings or mappings, of Access Servers to Session Managers. Further, the administrator may view the effect of creating a new Session Manager on traffic throughout.

In response to creation of graphical symbols representing Session Managers and bindings or mappings, the system may create or instantiate information, objects, and data relationships that cause the system to re-configure itself to execute in the desired manner.

Hardware Overview

Figure 7:
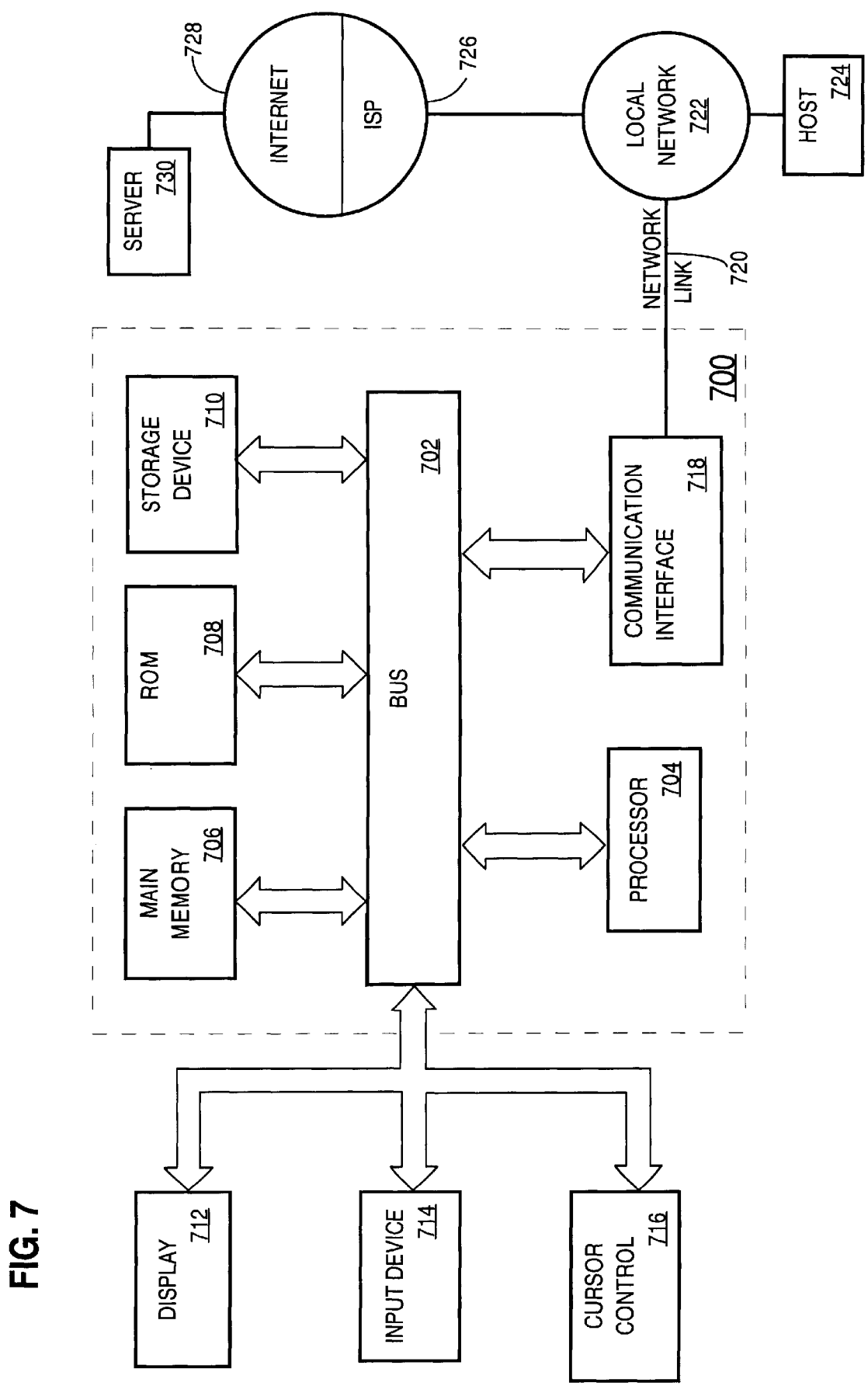
FIG. 7 is a block diagram of a computer system with which aspects of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for managing sessions in a stateless network system. According to one embodiment of the invention, managing sessions in a stateless network system is provided by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for managing sessions in a stateless network system as described herein.

The received code may be executed by processor 704 as it is received, and/or stored in storage device 710, or other non-volatile storage for later execution. In this manner, computer system 700 may obtain application code in the form of a carrier wave.

Alternatives, Variations, Advantages

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Further, it will be apparent that the approaches and system described herein has numerous advantages over prior approaches. For example, the system is secure, simple to use, simple to administer, scalable to support a large number of users, easily customized by each installation and easily integrated with online resources.

What is claimed is:

1. A method of managing sessions in a stateless network system that includes a plurality of first servers each controlling access by one of a plurality of clients to resources of a plurality of second servers, comprising the steps of:

creating a session manager that is bound to at least one of the first servers;

receiving, at one of the first servers, a request of the client to obtain one of the resources of one of the second servers;

determining, at the session manager from information stored therein, whether the client is part of an authenticated session with any of the first servers;

granting the client access to the resource only when the information in the session manager indicates that the client is part of the authenticated session.

2. The method recited in claim 1, wherein the determining step comprises determining, at the session manager from information stored therein and based on a session identifier that is generated by the one of the first servers and provided to the session manager, whether the session identifier is valid; and granting the client access to the resource only when the session identifier indicates that the client is part of a valid session.

3. The method recited in claim 1, comprising the steps of:

determining, at the session manager from information stored therein and based on a session identifier that is generated by the one of the first servers and provided to the session manager, whether the session identifier is valid;

determining, at the session manager, whether the client has failed to contact the any of the first servers within a pre-determined period of time; and granting the client access to the resource only when the session identifier indicates that the client is part of a valid session and the client has contacted the any of the first servers within the pre-determined period of time.

4. The method recited in claim 1, comprising the steps of:

determining, at the session manager from information stored therein and based on a session identifier that is generated by the one of the first servers and provided to the session manager, whether the session identifier is valid;

determining, at the session manager, whether the session identifier has been revoked;

granting the client access to the resource only when the session identifier indicates that the client is part of a valid, un-revoked session.

5. The method recited in claim 1, further comprising the steps of:

creating and storing a plurality of session managers, each session manager being associated with the at least one of the first servers, each session manager having a locally stored set of session information defining one or more valid sessions between the clients and the second servers; and synchronizing the session information of each of the session managers with the session information of all other session managers.

6. The method recited in claim 1, further comprising the steps of:

creating and storing a plurality of session managers, each session manager being associated with the at least one of the first servers, each session manager having a locally stored set of session information defining one or more valid sessions between the clients and the second servers;

when one of the session managers is created:

receiving, at that session manager, a list of all other session managers that are online;

synchronizing the session information of that session manager with each session manager in the list; and storing information in that session manager indicating that it is online.

7. The method recited in claim 1, further comprising the step of creating and storing, in association with each of the first servers, a monitoring element that monitors whether each of the first servers is bound to an associated session manager.

8. The method recited in claim 1, further comprising the steps of creating and storing a topology management element that communicates with all of the first servers and each of one or more session managers and determines whether each first server is bound to an associated session manager.

9. The method recited in claim 1, further comprising the steps of:

creating and storing a topology management element that communicates with all of the first servers and each of one or more session managers and determines whether each first server is bound to an associated session manager;

registering the one of the first servers with one of the session managers by creating and storing, in association with each of the first servers, a monitoring element that monitors whether each of the first servers is bound to an associated session manager;

registering each of the session managers with the topology management element.

10. The method recited in claim 1, further comprising the steps of:

creating and storing, in association with each of the first servers, a topology management element that monitors whether the at least one of the first servers is bound to a first session manager;

using the topology management element, detecting a failure of the first session manager;

at the one of the first servers, binding the at least one of the first servers to a second session manager;

monitoring, with the topology management element, whether the at least one of the first servers is bound to the second session manager.

11. The method recited in claim 1, further comprising the steps of:

creating and storing, in association with each of the first servers, a topology management element that monitors whether the at least one of the first servers is bound to a first session manager;

using a first interceptor that is bound to the topology management element, detecting a failure of the first session manager, and in response thereto, deactivating the first session manager;

using a second interceptor that is bound to the one of the first servers, detecting the failure of the first session manager, and in response thereto, at the one of the first servers, binding the at least one of the first servers to a second session manager;

monitoring, with a third interceptor that is bound to the second session manager, whether the at least one of the first servers is bound to the second session manager.

12. A method of managing sessions in a stateless network system that includes a plurality of protected servers each controlling access by one of a plurality of clients to resources of a plurality of second servers, comprising the steps of:

creating a session manager that is bound to at least one of the protected servers;

receiving, at one of the protected servers, a request of the client to obtain one of the resources of one of the second servers;

determining, at the session manager from information stored therein, whether the client is part of an authenticated session with any of the protected servers;

when the information in the session manager indicates that the client is not part of an authenticated session, requesting and receiving session authentication information from an authentication mechanism that is coupled to the session manager;

granting the client access to the resource only when the information in the session manager indicates that the client is part of the authenticated session.

13. A method of managing sessions in a stateless network system that includes a plurality of protected servers each controlling access by one of a plurality of clients to resources of a plurality of second servers, comprising the steps of:

creating a session manager that is bound to at least one of the protected servers;

creating and storing a topology management element that communicates with all of the protected servers and each of one or more session managers and determines whether each protected server is bound to an associated session manager;

receiving, at one of the protected servers, a request of the client to obtain one of the resources of one of the second servers;

determining, at the session manager from information stored therein, whether the client is part of an authenticated session with any of the protected servers;

when the information in the session manager indicates that the client is not part of an authenticated session, requesting and receiving session authentication information from an authentication mechanism that is coupled to the session manager;

granting the client access to the resource only when the information in the session manager indicates that the client is part of the authenticated session;

using the topology management element, detecting a failure of a first session manager;

at the one of the protected servers, binding the at least one of the protected servers to a second session manager;

monitoring, with the topology management element, whether the at least one of the protected servers is bound to the second session manager.

14. An apparatus for managing sessions in a stateless network that includes a plurality of first servers each controlling access by one of a plurality of clients to resources of a plurality of second servers, the apparatus comprising:

at least one session manager coupled to and associated with each one of the first servers and accessible over the network; and machine executable instructions stored in association with and executed by each of the session managers, wherein the instructions are configured to cause the session managers to carry out the steps of:

receiving, at one of the first servers, a request of the client to obtain one of the resources of one of the second servers;

determining, at the session manager from information stored therein, whether the client is part of an authenticated session with any of the first servers;

granting the client access to the resource only when the information in the session manager indicates that the client is part of the authenticated session.

15. The apparatus recited in claim 14, further comprising a topology management element that communicates with all of the first servers and all of the session managers and determines whether each first server is bound to an associated session manager.

16. The apparatus recited in claim 14, further comprising:

a topology management element that communicates with all of the first servers and all of the session managers and determines whether each first server is bound to an associated session manager; and instructions which, when executed by the one of the first servers, register the one of the first servers with one of the session managers by creating and storing, in association with each of the first servers, a monitoring element that monitors whether each of the first servers is bound to its associated session manager and register each of the session managers with the topology management element.

17. The apparatus recited in claim 14, further comprising:

a topology management element that communicates with all of the first servers and all of the session managers and determines whether each first server is bound to an associated session manager; and instructions which, when executed by the one of the first servers, carry out the steps of:

using the topology management element, detecting a failure of a first session manager;

at the one of the first servers, binding at least one of the first servers to a second session manager;

monitoring, with the topology management element, whether the at least one of the first servers is bound to the second session manager.

18. The apparatus recited in claim 14, further comprising:

a topology management element that communicates with all of the first servers and all of the session managers and determines whether each first server is bound to an associated session manager; and instructions which, when executed by the one of the first servers, carry out the steps of:

using a first interceptor that is bound to the topology management element, detecting a failure of a first session manager, and in response thereto, deactivating the first session manager;

using a second interceptor that is bound to the one of the first servers, detecting the failure of the first session manager, and in response thereto, at the one of the first servers, binding at least one of the first servers to a second session manager;

monitoring, with a third interceptor that is bound to the second session manager, whether the at least one of the first servers is bound to the second session manager.

19. A computer-readable medium carrying one or more sequences of instructions for managing sessions in a stateless network system that includes a plurality of first servers each controlling access by one of a plurality of clients to resources of a plurality of second servers, wherein execution of the one or more sequences of instructions by one or more processors causes the one or more processors to perform the steps of:

creating a session manager that is bound to at least one of the first servers;

receiving, at one of the first servers, a request of the client to obtain one of the resources of one of the second servers;

determining, at the session manager from information stored therein, whether the client is part of an authenticated session with any of the first servers;

granting the client access to the resource only when the information in the session manager indicates that the client is part of the authenticated session.

20. The computer-readable medium recited in claim 19, wherein the determining step comprises determining, at the session manager from information stored therein and based on a session identifier that is generated by the one of the first servers and provided to the session manager, whether the session identifier is valid; and granting the client access to the resource only when the session identifier indicates that the client is part of a valid session.

21. The computer-readable medium recited in claim 19, the instructions comprising the steps of:

determining, at the session manager from information stored therein and based on a session identifier that is generated by the one of the first servers and provided to the session manager, whether the session identifier is valid;

determining, at the session manager, whether the client has failed to contact the any of the first servers within a pre-determined period of time; and granting the client access to the resource only when the session identifier indicates that the client is part of a valid session and the client has contacted the at least one of the first servers within the pre-determined period of time.

22. The computer-readable medium recited in claim 19, the instructions comprising the steps of:

determining, at the session manager from information stored therein and based on a session identifier that is generated by the one of the first servers and provided to the session manager, whether the session identifier is valid;

determining, at the session manager, whether the session identifier has been revoked;

granting the client access to the resource only when the session identifier indicates that the client is part of a valid, un-revoked session.

23. The computer-readable medium recited in claim 19, the instructions further comprising the steps of:

creating and storing a plurality of session managers, each session manager being associated with the at least one of the first servers, each session manager having a locally stored set of session information defining one or more valid sessions between the clients and the second servers; and synchronizing the session information of each of the session managers with the session information of all other session managers.

24. The computer-readable medium recited in claim 19, the instructions further comprising the steps of:

creating and storing a plurality of session managers, each session manager being associated with the at least one of the first servers, each session manager having a locally stored set of session information defining one or more valid sessions between the clients and the second servers;

when one of the session managers is created:
receiving, at that session manager, a list of all other session managers that are online;
synchronizing the session information of that session manager with each other session manager in the list; and
storing information in that session manager indicating that it is online.

25. The computer-readable medium recited in claim 19, the instructions further comprising the step of creating and storing, in association with each of the first servers, a monitoring element that monitors whether each of the first servers is bound to an associated session manager.

26. The computer-readable medium recited in claim 19, the instructions further comprising the steps of creating and storing a topology management element that communicates with all of the first servers and each of one or more session managers and determines whether each first server is bound to an associated session manager.

27. The computer-readable medium recited in claim 19, the instructions further comprising the steps of:

creating and storing a topology management element that communicates with all of the first servers and each of one or more session managers and determines whether each first server is bound to an associated session manager;

registering the one of the first servers with one of the session managers by creating and storing, in association with each of the first servers, a monitoring element that monitors whether each of the first servers is bound to its associated session manager;

registering each of the session managers with the topology management element.

28. The computer-readable medium recited in claim 19, the instructions further comprising the steps of:

creating and storing, in association with each of the first servers, a topology management element that monitors whether the at least one of the first servers is bound to a first session manager;

using the topology management element, detecting a failure of the first session manager;

at the one of the first servers, binding the at least one of the first servers to a second session manager;

monitoring, with the topology management element, whether the at least one of the first servers is bound to the second session manager.

29. The computer-readable medium recited in claim 19, the instructions further comprising the steps of:

creating and storing, in association with each of the first servers, a topology management element that monitors whether the at least one of the first servers is bound to a first session manager;

using a first interceptor that is bound to the topology management element, detecting a failure of the first session manager, and in response thereto, deactivating the first session manager;

using a second interceptor that is bound to the one of the first servers, detecting the failure of the first session manager, and in response thereto, at the one of the first servers, binding the at least one of the first servers to a second session manager;

monitoring, with a third interceptor that is bound to the second session manager, whether the at least one of the first servers is bound to the second session manager.

30. A computer-readable medium carrying one or more sequences of instructions for managing sessions in a stateless network system that includes a plurality of first servers each controlling access by one of a plurality of clients to resources of a plurality of second servers, wherein execution of the one or more sequences of instructions by one or more processors causes the one or more processors to perform the steps of:

creating a session manager that is bound to at least one of the first servers;

receiving, at one of the first servers, a request of the client to obtain one of the resources of one of the second servers;

determining, at the session manager from information stored therein, whether the client is part of an authenticated session with any of the first servers;

when the information in the session manager indicates that the client is not part of an authenticated session, requesting and receiving session authentication information from an authentication mechanism that is coupled to the session manager;

granting the client access to the resource only when the information in the session manager indicates that the client is part of the authenticated session.

31. The method recited in claim 1, further comprising the step of periodically purging information about one or more inactive sessions that are older than a predetermined time period.

* * * * *